March 21, 1972  R. W. WHITE  3,650,950
MATERIAL SHEARING MIXER AND AERATOR
Filed Aug. 20, 1969  3 Sheet-Sheet 1

Robert W. White
INVENTOR

BY Clarence A. O'Brien
and Harvey B. Jacobson
Attorneys

March 21, 1972   R. W. WHITE   3,650,950
MATERIAL SHEARING MIXER AND AERATOR
Filed Aug. 20, 1969   3 Sheet-Sheet 2
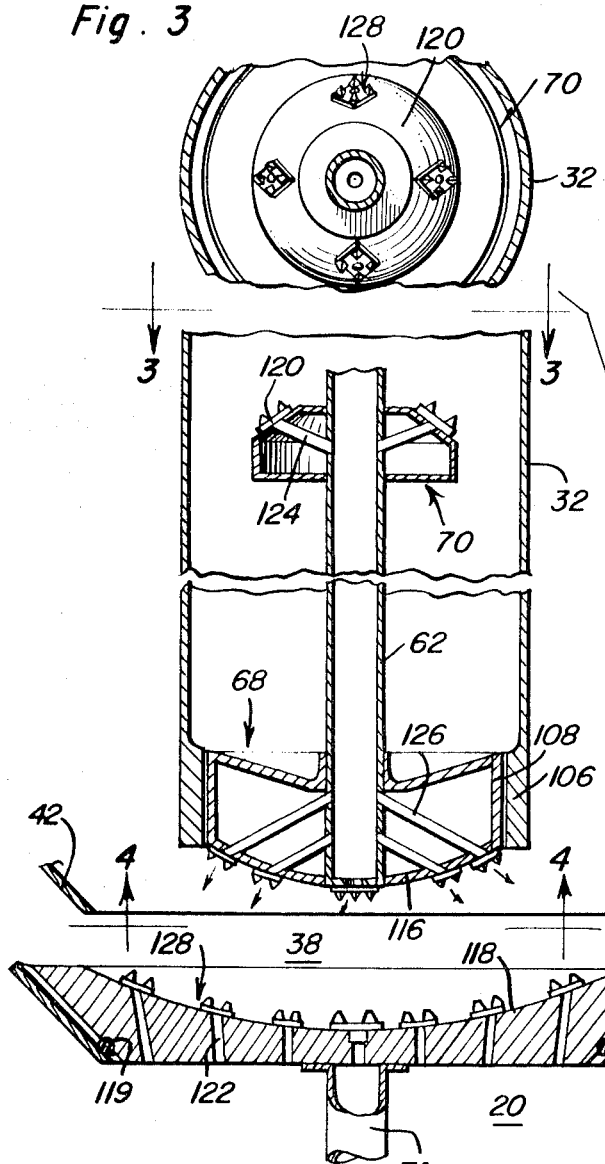
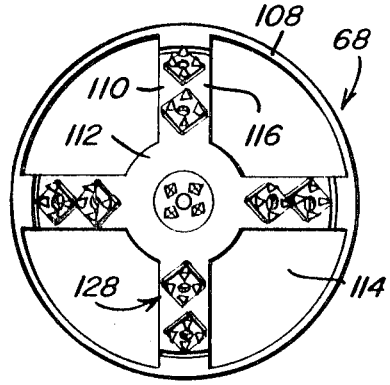
Robert W. White
INVENTOR
BY Clarence A. O'Brien
and Harvey B. Jacobson
Attorneys

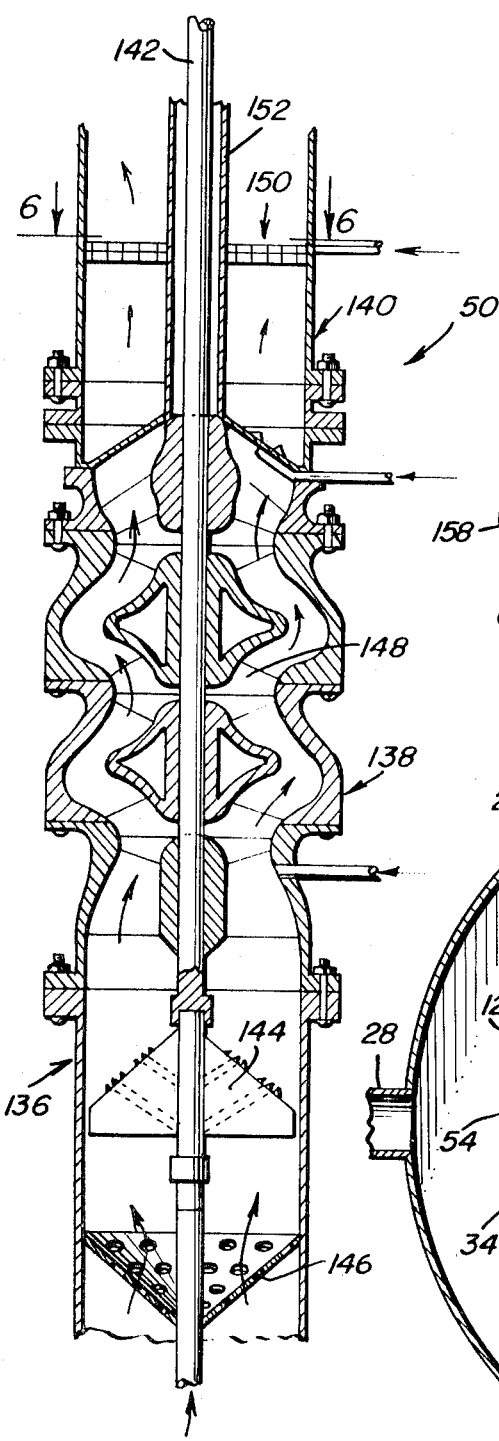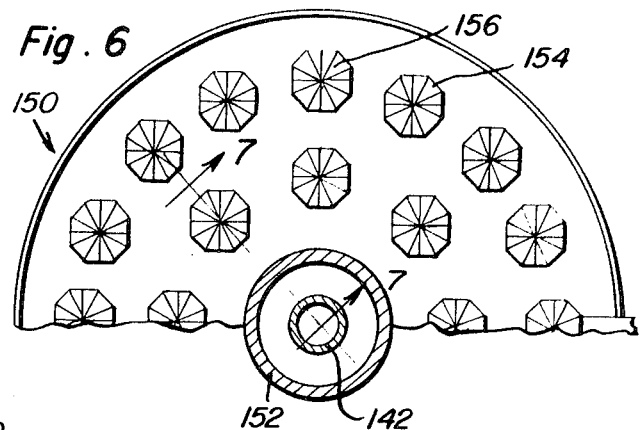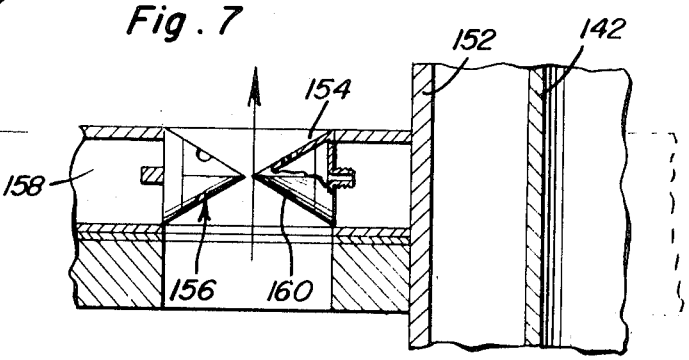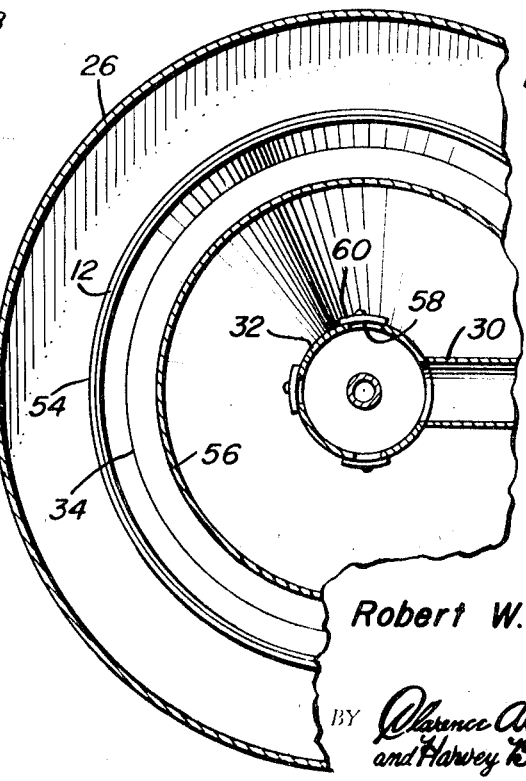

3,650,950
Patented Mar. 21, 1972

3,650,950
MATERIAL SHEARING MIXER AND AERATOR
Robert W. White, 409 S. Union Ave., P.O. Box 74,
Salem, Ohio 44460
Filed Aug. 20, 1969, Ser. No. 851,702
Int. Cl. B01d 43/00
U.S. Cl. 210—60                               24 Claims

ABSTRACT OF THE DISCLOSURE

Fluent materials including sewage and industrial discharges such as exhaust gases, smoke and slurries are treated to remove noxious odors, to decompose and oxidize undesirable compounds and to condition the waste material for easier handling or subsequent treatment. The fluent material is subjected to shearing stresses simultaneously with the injection of an oxidizing agent such as ozone to enhance biochemical and chemical treatment of the material as well as to physically treat the material.

This invention relates to the treatment of waste materials including gases, liquids, particulate solids and intermixtures thereof.

The disposal of industrial as well as household waste products is becoming one of the major problems of modern society. Waste product treatment is therefore required to not only facilitate handling of wastes for disposal purposes but to also eliminate noxious odors and air pollution as well as to convert the waste products into a more desirable form. Toward this end, the waste products are subjected to biochemical, chemical and physical treatment.

In connection with waste products such as sewage subjected to aeration and bacterial treatment by way of example, presently known methods involve initial settling of the waste material in settling tanks, use of trickling filters, activated sludge tanks and aeration tanks having slow moving paddles or agitators with diffused air pumped into the tanks through diffuser plates. Also, waste materials have been passed through digesters for disposal and dewatered in order to facilitate handling.

Also, in treating waste materials certain oxygen requirements must be met. For example, proper sewage treatment involves a biochemical oxygen demand by live organisms such as aerobic bacteria responsible for decomposition of organic matter. There is also a chemical oxygen demand for oxidizing solids of reduced size containing many chemical compounds including carbon compounds not subject to microbial or bacteriological treatment. Such oxidation renders the solids soluble in water or converts the solids to acid or renders them easily floculated by subsequent treatment. In order to eliminate noxious odors, a saturating quantity of oxygen is required for aeration.

Existing equipment for treating waste material as aforementioned, have several drawbacks which often makes treatment inefficient and costly. For example, when utilizing atmospheric air in order to meet the oxygen requirement, the low solubility rate of molecular oxygen within the air presents a problem. Further, air drawn in forms bubbles within liquid mixtures which tend to agglomerate and rise to the surface. There is also a loss of oxygen due to encapsulation within nitrogen films while the low rate, random interfacial contact between the oxygen and solid particles or bacteria makes treatment inefficient. Thus, in order to meet the various oxygen demands, costly procedures must be utilized including the use of allotropic oxygen such as ozone. In utilizing ozone as the oxidizing agent, inefficiency and excessive costs arise if the gas bubble containing ozone at low partial pressure in the accompanying air, is not ruptured to release ozone for useful contact at the maximum shear moment. Also, ozone decomposes into the more stable molecular form of oxygen at an extremely fast rate in water increasing with greater hydroxyl ion concentration. The catalytic effect of various chemicals and the addition of heat to the treating zone also accelerates decomposition.

In accordance with the present invention, physical treatment of waste material is enhanced by being subjected to shearing forces while at the same time, oxygen, ozone and air are injected at locations of maximum shearing stress. The cooperative relationship between material shearing and simultaneous pressure injection of the oxidizing agent has the effect of increasing the total particle surface area exposed to chemical and biochemical action, reduces surface tension which ordinarily restricts surface exposure to chemical and biochemical action and avoids agglomeration of gas bubbles or encapsulation thereof within films. Thus, the waste material is made more receptive to treatment and use of ozone is made more efficient and economical. The use of ozone ($O_3$) is of course desirable as a more rapid oxidizing agent having a very low electro-negative oxidation potential and a more rapid solubility rate in water as compared to the more stable form of oxygen ($O_2$). Furthermore, ozone acts as a catalyst for molecular oxygen when reacting with the waste material under shearing stresses.

The apparatus devised in accordance with the present invention provides relatively movable working surfaces to establish a critical shearing zone within which shearing stresses are developed and into which ozone, air and oxygen are injected whereby shearing of the waste material makes it more receptive to dissolved oxygen, microbial or bacterial action, oxidation of solids and aeration as well as to utilize, by shear contact unstable ozone before it is decomposed to stable oxygen. Also, a higher solids loading of the treating apparatus is made possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged partial sectional view showing in greater detail certain features of the apparatus shown in FIG. 1.

FIG. 3 is a partial top sectional view taken substantially through a plane indicated by section line 3—3 in FIG. 2.

FIG. 4 is a bottom transverse view taken substantially from a plane indicated by section line 4—4 in FIG. 2.

FIG. 5 is an enlarged longitudinal sectional view through the turbine pump mechanism shown in FIG. 1.

FIG. 6 is an enlarged partial sectional view taken substantially through a plane indicated by section line 6—6 in FIG. 5.

FIG. 7 is an enlarged partial sectional view taken substantailly through a plane indicated by section line 7—7 in FIG. 6.

FIG. 8 is an enlarged partial sectional view taken substantially through a plane indicated by section line 8—8 in FIG. 1.

FIG. 9 is an enlarged partial perspective view of a working surface section associated with the apparatus of FIG. 1.

FIG. 10 is an enlarged partial sectional view taken substantially through a plane indicated by section line 10—10 in FIG. 9.

Figure 1:
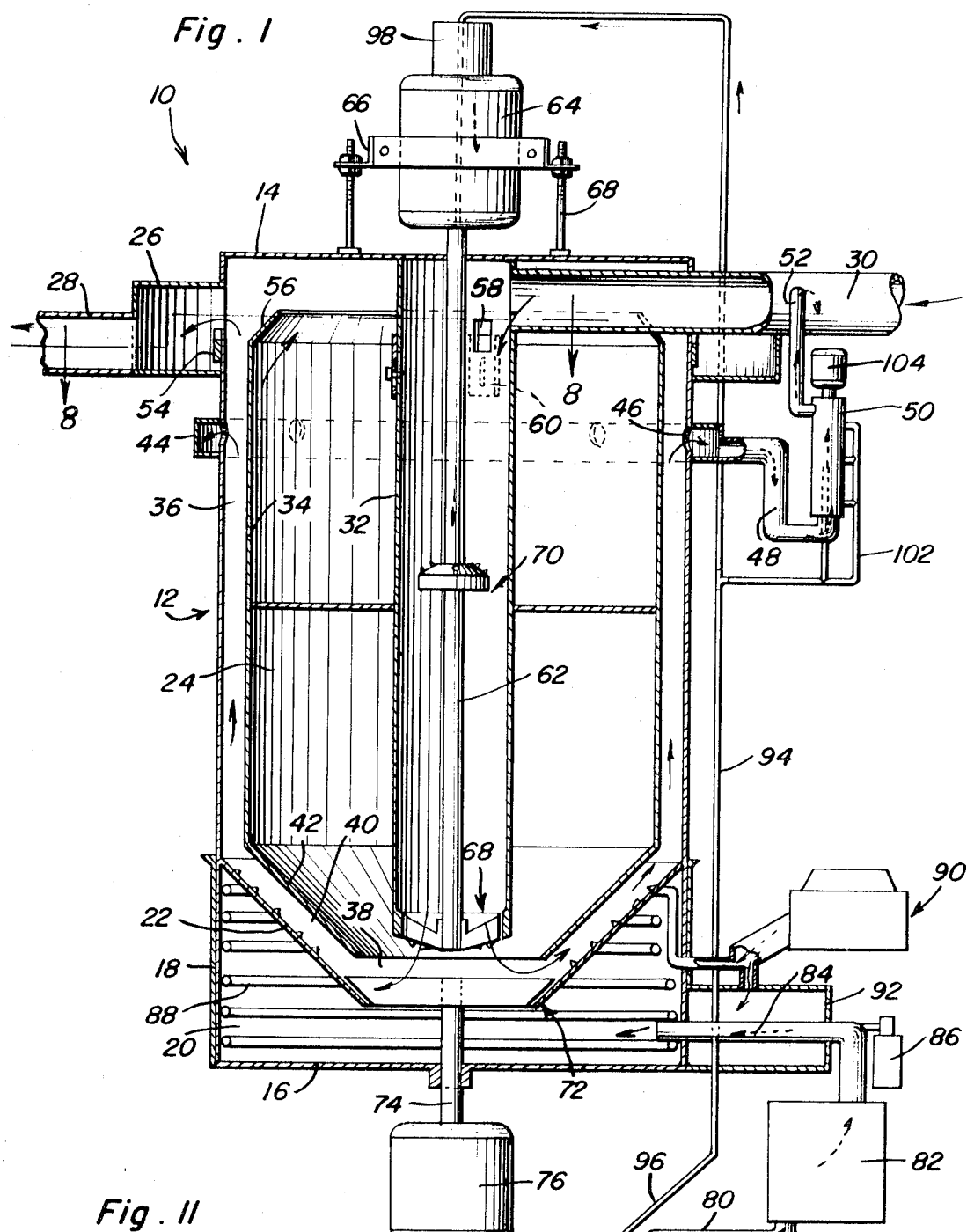
FIG. 1 is a simplified, side sectional view throgh apparatus forming one embodiment of the present invention.

Referring now to the drawings in detail and initially to FIG. 1, the apparatus forming one embodiment of the present invention is generally denoted by reference numeral 10. The apparatus includes an outer cylindrical tank 12 having an upper end closed by a top wall 14 and a lower end closed by a bottom wall 16. The lower end portion of the tank is surrounded by an insulating layer 18 to form a heat transfer barrier for a storage chamber 20 formed between the bottom wall 16 and a downwardly converging lower wall 22 above which a treatment chamber 24 is formed within the tank 12. An annular manifold 26 is mounted on the tank adjacent the top wall 14 in communication with an effluent outlet conduit 28. The inflow of waste material to be treated within the apparatus, is conducted by an inflow conduit 30 which extends radially into the tank adjacent the top wall 14 to a radially inner, vertical mixing tube 32.

As shown in FIGS. 1 and 8, the inner mixing tube 32 through which the inflow of waste material is downwardly conducted is fixedly spaced from an annular wall 34 within the tank 12 froming a radially outer, annular channel 36 through which treated waste mateiral is conducted upwardly against the force of gravity from a shearing zone 38 with which the annular channel 36 communicates through the lower channel portion 40 formed between the lower conical wall portion 42 and the conical wall portion 22 separating the treating chamber from the storage chamber 20. Upward flow of the treated waste material is induced by means to be hereinafter explained. A portion of the outflow of treated waste material rising within the radially outer channel 36, enters a recirculating manifold 44 through ports 46. The manifold 44 is connected by an intake conduit 48 to the lower end of a turbine pump assembly generally referred to by reference numeral 50 from which the treated waste material is returned by the discharge conduit 52 to the inflow conduit 30. Thus, a portion of the outflow may be conditioned by the pump assembly and recirculated. Another portion of the outflow spills over a discharge weir 54 into the outflow manifold 26. Finally, the remainder of the outflow spills over the upper conical wall portion 56 into the treating chamber 24 within which physical, chemical and biochemical treatment occurs. A portion of this spill over is also recirculated through the inner mixing tube 32 through recirculating ports 58. The size of the recirculating ports 58 may be effectively varied by adjustable plates 60 as more clearly seen in FIG. 8.

With continuing reference to FIG. 1, a hollow drive shaft 62 extends through the inner mixing tube 32 and is drivingly connected at its upper end to a drive motor 64. The motor 64 is supported by a mounting bracket 66 and mounting studs 68 in adjustably spaced relation above the top wall 14 in order to adjustably position a flow dispersing rotor 68 connected to the lower end of the drive shaft 62 at the lower end of the mixing tube 32. Also secured to the drive shaft 62 within the mixing tube 32 intermediate its upper and lower ends, is a mixing rotor 70. The dispersing rotor 68 is vertically spaced above a flow directing rotor 72 connected to the upper end of a hollow drive shaft 74 driven by a second motor 76 positioned below the tank 12. The motors 64 and 76 are designed to impart rotational movement to the rotors 68 and 72 in opposite directions in order to exert a shearing action on the waste material within the shearing zone 38 which is disposed below the rotor 68 above the lower end of the treating chamber, formed by the rotor 72.

The storage chamber 20 forms a gas reservoir for an oxidizing medium which may be a mixture of air, molecular oxygen and an allotropic form of oxygen such as ozone. In the embodiment illustrated in FIG. 1, an ozone generator 78 is provided from which a supply of ozone is conducted by the conduit 80 to the intake of a compressor 82 from which the ozone is supplied under pressure through discharge conduit 84 to the storage chamber 20. The ozone may be produced in ozone generator 78 from either atmospheric air or pure oxygen to increase ozone output. In some instances where ozone is not required pure oxygen from oxygen tank 86 can be introduced to line 84. The ozone produced by the generator forms an oxidizing mixture supplying the various oxygen demands such as respiratory oxygen for live organisms responsible for microbial decomposition of organic matter, oxygen for chemically combining with chemical compounds including carbon compounds not subject to bacteriological treatment and oxygen necessary for aeration. In order to prevent decomposition of the ozone before it is utilized and increase its solubility in water, it is maintained at a lowered temperature within the storage chamber 20. Toward this end, refrigerant conducting coils 88 are mounted within the storage chamber in heat exchange relation to the gas stored therewithin. The refrigerant coils 88 form part of a refrigerating system including the refrigerating equipment 90 externally of the tank to which the coils are connected. The refrigerant is also supplied for cooling purposes to a manifold 92 surrounding the discharge conduit 84 through which the oxidizing medium is supplied to the storage chamber 20 and through conduits 94 and 96 to manifolds 98 and 100 associated with the drive motors 64 and 76 respectively. Thus, gas in the form of ozone, molecular oxygen and air is conducted through the drive motors into the hollow drive shafts 62 and 74. In this fashion, the gas may be introduced into the waste material being treated as will be hereafter explained. The gas is also conducted through the branch conduit 102 to the turbine pump assembly 50 for introduction into the treated waste material being recirculated by the pump assembly. Part of the gas is applied to the pump as will be explained in further detail hereafter.

Referring now to FIGS. 2, 3 and 4, the inner mixing tube 32 is provided with a lower end portion 106 surrounding the flow dispersing rotor 68 which includes a radially outer ring portion 108 interconnecting a plurality of radial blade portions 110, four of which are shown in the illustrated embodiment. The radial blade portions 110 are interconnected with the drive shaft 62 through a hub portion 112 and form therebetween spaces 114 through which waste material may flow downwardly from the lower end portion of the mixing tube into an active zone 38 defined below the convex bottom surface 116 of the rotor blade portions 110. It will therefore be apparent that the rotor blade portions 110 impart a vortical movement to the waste material being discharged from the lower end of the mixing tube 32 in order to disperse the same into the zone 38.

The bottom convex surface 116 of the flow dispersing rotor 68 confronts an upper concave surface 118 on the flow directing rotor 72. The rotor 72 forms the lower wall of the treating chamber and is provided with wiping seals 119 to seal the opening at the lower end of wall 22. Also, the rotor 72 defines the limits of the zone 38 and is rotated in a direction opposite to the surface 116 of the flow dispersing rotor 68. The concave curvature of the surface 118 also directs flow radially outward into the channel portions 40.

As the waste material flow downwardly through the mixing tube 32, it is also subjected to the mixing and shearing action of the rotor 70 by impinging on its upwardly converging conical surface 120. Thus, the surface 120 of the rotor 70 as well as the surfaces 116 of rotor 68 and 118 of rotor 72, form working surfaces contacted by the waste material being treated. Furthermore, gas introduced into the waste material being treated is injected through these working surfaces. Thus, in the case of the rotors 70 and 68 fixedly mounted on the drive shaft 62, gas is conducted to discharge branch tubes 124 and 126 within rotors 70 and 68 respectively while drive shaft 74 supplies gas to the rotor 72. As shown in FIG. 2, the illustrated embodiment employs a solid rotor 72 having a central pasage through which gas is conducted from conduit 96 to some projection clusters 128, gas also being conducted through radially spaced passages 122 from reservoir 20 to other projection clusters as described hereinafter. Openings 121 in the bottom 22 of the tank establish fluid communication between the reservoir and the lower channel portion 40 to laterally extend the action beyond rotor 72.

Mounted on each of the working surfaces 120, 116 and 118 are shear projection clusters 128 which extend from the working surfaces of the rotors into contact with the waste material impinging on the working surfaces. A typical projection cluster is shown for example in FIG. 9 wherein a plurality of projections 130 arranged in a predetermined pattern extend from a housing 131 on the working surface and are formed by flat, angularly related impact surfaces 132 to produce shearing impact between the material being treated and the projections 130 in response to movement of the projections through the material. Each projection 130 may be provided with a plurality of orifice openings 134 through which the gas mixture may be discharged. The gas enters the housing 131 through a threaded inlet portion 135 as shown in FIG. 10. It will therefore be apparent that jets of oxidizing gas will be discharged into the waste material at critical shear zones within the projection clusters where maximum shear stress is developed by virtue of the contact between the waste material and the moving surfaces 132 on the projections 130. In the case of the projections associated with the surfaces 116 and 118 on rotors 68 and 72, exceptionally high shearing stresses are developed since these rotors are driven in counter-rotating directions. Projections 130' or projection clusters to which gas is supplied may also be placed on the bottom wall 22 of the channel portion 40 in order to effect continued shearing action since the waste material entering the channel portion 40 will still have a relatively high kinetic energy and velocity imparted thereto by the action of the rotors 68 and 72.

Figure 11:
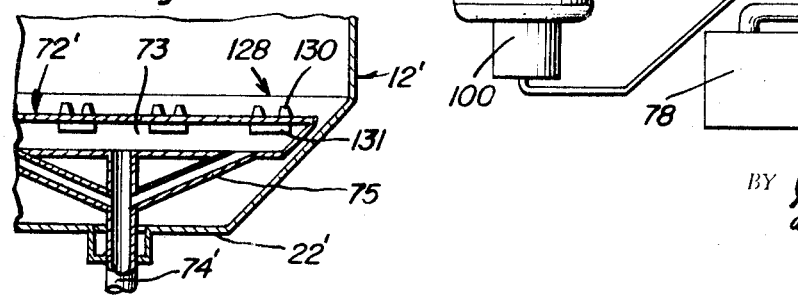
FIG. 11 is a partial sectional view through a modified form of tank bottom and rotor.

The number of projections and projection surface area as well as the relative speeds of the rotors 68 and 72 may be varied in accordance with inflow and outflow rates of the waste material being treated and other requirements depending upon the particular type of waste material being treated. It is also contemplated, that simplified versions of the apparatus hereinbefore described may suffice for certain treating requirements so that apparatus construction and maintenance costs may be reduced. For example, one of the rootrs 68 and 72 may be eliminated together with an associated drive motor. Other peripheral equipment such as the pump assembly 50 may also be eliminated. A portable version of the apparatus may include, for example, a closed bottom tank 12' as shown in FIG. 11, having a bottom wall 22' through which a hollow rotor shaft 74' extends to drive a hollow type rotor 72' on which projection clusters 128 are welded into its top plate with its inlet portion in communication with chamber 73. Gas is supplied to the chamber 73 in the rotor from shaft 74' and through hollow angle braces 75 to more uniformly distribute pressurized gas being discharged into the critical shearing zones bordered by the projection clusters 128. The important attribute of the apparatus retained in all forms of the invention, however, involves the injection of the gaseous oxidizing medium into the waste material being treated at a location where maximum shearing force is applied to the material. Thus, any form of apparatus constructed in accordance with the present invention will include a rotor presenting a relatively movable working contact surface through which shearing forces are applied to the waste material being treated by projections on the working surface with orifices formed in such projection surfaces so that the oxidizing medium may be introduced at the proper relatively critical location.

The principles of the present invention herebefore discussed are also applicable to the pump assembly 50. As shown in FIGS. 5, 6 and 7, the pump assembly includes a vertically elongated, tubular casing composed of a lower suction inlet section 136 which is secured to an impeller section 138 disposed intermediate the inlet section 136 and an outlet section 140. A drive shaft 142 driven by the motor 104 aforementioned, extends through the interconnected sections of the pump casing. A mixing and shearing rotor 144 having upwardly converging vanes is secured to a lower hollow end portion of the pump drive shaft 142 within the inlet section 136 closely spaced above a conical, perforated strainer element 146 through which the gas supply conduit 102 extends. Multi-stage impeller blades 148 are secured to the pump shaft 142 within the impeller section. Within the outlet section 140, a shear plate assembly 150 is fixedly mounted between the casing section and a tubular member 152 enclosing the pump shaft 142.

The material being recirculated by the pump assembly enters the inlet casing section 136 through the perforated strainer element 146 and is subjected to the shearing action of rotor 144 through which gas is introduced for cooperative action as in the case of the rotors 68, 70 and 72 hereinbefore described. Upward flow of the waste material is induced by the impeller blades 148. While being subjected to the action of the impeller blades, gas is introduced into the impeller section for mixing with the flowing material. Gas is also introduced through the shear plate assembly 150. The shear plate as more clearly seen in FIGS. 6 and 7, includes a plurality of apertures 154 through which the flow material is discharged, each aperature having projections 156 extending thereinto, said projections being formed by flat, angulated surfaces as in the case of the shear producing projections 130 hereinbefore described. Oxidizing gas supplied to manifold 158 is introduced into the apertures 154 laterally of the direction of flow through orifices 160.

It will be apparent that the pump assembly 50 will in itself provide a mixing a shearing action in combintion with the introduction of the oxidizing gas to effect waste material treatment as well as to enhance the treatment performed by the primary apparatus with which it is shown associated in FIG. 1. It will also be appreciated that the operating principles associated with the described apparatus while particularly useful in connection with the treatment of sewage, may also be adapted for a variety of other waste materials such as industrial exhaust gas, smoke and various solutions, collodial suspensions and mixtures of particulate solids, liquids and gases in slurries and sludges.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A method of treating fluent material comprising the steps of feeding the fluent material to a treating zone; moving an impact surface through the fluent material to apply shearing forces to the fluent material within the treating zone; and injecting an active agent into the fluent material within the treating zone from said moving surface at a location thereon producing maximum shearing stress.

2. The method of claim 1 including the step of cooling the active agent to increase the solubility thereof within the fluent material.

3. The method of claim 2 wherein said active agent includes allotropic forms of oxygen.

4. The method of claim 1 wherein said active agent includes allotropic forms of oxygen.

5. A method of treating exhaust gases comprising the steps of: feeding the exhaust gases to a treating zone;

increasing the kinetic energy of the exhaust gases entering the treating zone; directing flow of the exhaust gases into the treating zone between relatively movable surfaces; injecting an allotropic form of oxygen into the exhaust gases from said moving surfaces; cooling the oxygen to increase solubility thereof within the exhaust gases and partially recirculating treated exhaust gases through the treating zone.

6. The method of claim 5 wherein the fluent material further includes solid particles and liquid mixed with the exhaust gases.

7. A method of treating fluent material comprising the steps of: feeding the fluent material to a treating zone; applying shearing forces to the fluent material within the treating zone; and injecting an active agent into the fluent material from a moving surface at a location within the treating zone of maximum shearing stress, the fluent material comprising exhaust gases.

8. The method of claim 7 wherein the fluent material further includes solid particles and liquid mixed with the exhaust gases.

9. Apparatus for treating fluent material comprising a housing enclosing a treating chamber, inlet conduit means for conducting the fluent material to an active zone within the treating chamber, a source of treating medium under pressure, power operated means having impact surfaces exposed to the fluent material for exerting shearing forces on the fluent material entering the active zone, and movable injection means mounted by the power operated means and connected to said source for introducing said medium into the active zone from said impact surfaces at locations exerting maximum shearing forces.

10. Apparatus for treating fluent material comprising a housing enclosing a treating chamber, inlet conduit means for conducting the fluent material to an active zone within the treating chamber, a source of treating medium under pressure, power operated means having impact surfaces exposed to the fluent material for exerting shearing forces on the fluent material entering the active zone, and moveable injection means mounted by the power operated means and connected to said source for introducing said medium into the active zone from said impact surfaces while the fluent material is being subjected to said shearing forces, said power operated means including a flow directing rotor having an impact surface redirecting flow of the fluent material impinging thereon and a plurality of projections extending from said impact surface into the active zone, said injection means extending through the projections.

11. The combination of claim 10 wherein said power operated means further includes a flow dispersing rotor having blades confronting the impact surface of the flow directing rotor to define the active zone therebetween and a plurality of projections extending from the blades of the flow dispersing rotor into the active zone.

12. The combination of claim 11 wherein the power operated means still further includes motor means drivingly connected to said rotors for imparting counter rotational movement thereto.

13. The combination of claim 12 wherein said injection means includes a plurality of orifices mounted by the projections from which jets of said medium are discharged into the active zone.

14. The combination of claim 13 wherein said impact surface has a concave curvature forming a lower wall of the treating chamber.

15. The combination of claim 14 wherein said blades of the flow dispersing rotor having a convex curvature spaced above the lower wall of the treating chamber.

16. The combination of claim 15 including an outlet channel mounted by the housing surrounding the treating chamber in fluid communication with the active zone and radially spaced from the inlet conduit means, said treating chamber having recirculating ports in fluid communication with the inlet conduit means above the active zone and pump means connected to the outlet channel for partially recirculating treated fluent material from the active zone and fluidizing the same.

17. The combination of claim 16 wherein said pump means includes an elongated pump casing having an inlet section, an impeller section and an outlet section, a pump shaft extending through said casing, fluid shearing means mounted by the shaft within the inlet and outlet sections of the casing, impeller blade means mounted by the shaft within the impeller section axially between the fluid shearing means, and means for supplying said chemical reaction medium to the fluid shearing means and the impeller blade means from said source.

18. The combination of claim 16 including reservoir means mounted within the housing to which said source is connected for storing the treating medium, and refrigerating means mounted within the reservoir means for cooling the medium.

19. The combination of claim 9 wherein said power operated means includes a flow dispersing rotor having working surfaces bordering the active zone and a plurality of projections on which the impact surfaces are formed extending from the working surfaces into the active zone, said projections being arranged in a cluster surrounding a shearing zone.

20. The combination of claim 19 wherein said injection means includes a plurality of orifices mounted by the projections from which jets of said medium are discharged into the shearing zone.

21. Apparatus for treating fluent material comprising a housing enclosing a treating chamber, inlet conduit means for conducting the fluent material to an active zone within the treating chamber, a source of treating medium under pressure, power operated means having impact surfaces exposed to the fluent material for exerting shearing forces on the fluent material entering the active zone, and movable injection means mounted by the power operated means and connected to said source for introducing said medium into the active zone from said impact surfaces while the fluent material is being subjected to said shearing forces, an outlet channel mounted by the housing surrounding the treating chamber in fluid communication with the shearing zone and radially spaced from the inlet conduit means, said treating chamber having recirculating ports in fluid communication with the inlet conduit means above the shearing zone and pump means connected to the outlet channel for partially recirculating treated fluent mateiral from the shearing zone and fluidizing the same, said pump means including an elongated pump casing having an inlet section, an impeller section and an outlet section, a pump shaft extending through said casing, fluid shearing means mounted by the shaft within the inlet and outlet sections of the casing, impeller blade means mounted by the shaft within the impeller section, axially between the fluid shearing means, and means for supplying said medium to the fluid shearing means and the impeller blade means from said source.

22. Apparatus for treating fluent material comprising a housing enclosing a treating chamber, inlet conduit means for conducting the fluent material to an active zone within the treating chamber, a source of treating medium under pressure, power operated means for exerting shearing forces on the fluent material entering the active zone, and movable injection means mounted by the power operated means and connected to said source for introducing said medium into the active zone while the fluent material is being subjected to said shearing forces therein, a reservoir means mounted within the housing to which said source is connected for storing the treating medium, and refrigerating means mounted within the reservoir means for cooling the medium.

23. Apparatus for treating fluent material comprising a housing enclosing a treating chamber, inlet conduit means for conducting the fluent material to an active zone within the treating chamber, a source of treating medium under pressure, power operated means for exerting shearing forces on the fluent material entering the active zone, and movable injection means mounted by the power operated means and connected to said source for introducing said medium into the active zone while the fluent material is being subjected to said shearing forces therein, said power operated means including a pair of counter-rotating rotors between which the active zone is defined, and a plurality of projections extending from the rotors into the active zone having flat, angularly related surfaces in contact with the fluent material.

24. The combination of claim 23 wherein said injection means includes a plurality of orifices mounted by the projections from which jets of said medium are discharged into the active zone.

References Cited

UNITED STATES PATENTS

| | | | |
|---|---|---|---|
| 1,297,716 | 3/1919 | Moisant | 21—74.1 |
| 2,076,529 | 4/1937 | Durdin | 210—197 |
| 2,254,600 | 9/1941 | Ditto | 261—87 |
| 2,405,553 | 8/1946 | Allison | 210—63 |
| 2,609,189 | 9/1952 | Dering | 261—87 |
| 3,400,051 | 9/1968 | Hofschneider | 261—87 X |

REUBEN FRIEDMAN, Primary Examiner

T. G. WYSE, Assistant Examiner

U.S. Cl. X.R.

210—63, 197, 219, 261, 87